United States Patent [19]
O'Neill

[11] Patent Number: 5,158,609
[45] Date of Patent: Oct. 27, 1992

[54] WATER BASED AEROSOL MARKING PAINT

[75] Inventor: Paul J. O'Neill, Gardnerville, Nev.

[73] Assignee: Aervoe Pacific Company, Inc., Gardnerville, Nev.

[21] Appl. No.: 671,039

[22] Filed: Mar. 18, 1991

[51] Int. Cl.⁵ .................. C09D 201/00; C09D 7/00
[52] U.S. Cl. .................. 106/401; 106/236; 106/237; 106/238; 106/239; 106/241; 106/400; 106/468; 106/471; 106/476; 106/486; 106/DIG. 4
[58] Field of Search .......... 106/401, 468, 471, 476, 106/486, DIG. 4, 236, 237, 238, 239, 241

[56] References Cited

U.S. PATENT DOCUMENTS

| | | | |
|---|---|---|---|
| 4,420,575 | 12/1983 | Rappaport | 106/252 |
| 4,690,713 | 9/1987 | Terae et al. | 252/358 |
| 5,073,298 | 12/1991 | Gentle et al. | 252/358 |

Primary Examiner—William R. Dixon, Jr.
Assistant Examiner—Scott L. Hertzog
Attorney, Agent, or Firm—Rosenblum, Parish & Isaacs

[57] ABSTRACT

An improved water based aerosol paint is particularly well-suited for use in site marking applications. Its high content of calcium carbonate provides a support for the pigment and resin film. A straight chain, low molecular weight hydrocarbon with between 5 and 8 carbons is used to control foaming.

20 Claims, 1 Drawing Sheet

WATER BASED AEROSOL MARKING PAINT

BACKGROUND OF THE INVENTION

1. Field of the Invention

This invention relates to an improved water based aerosol marking paint. More specifically, it relates to a water based aerosol marking paint having a high non-volatile content suitable for marking on asphalt or dirt. In addition, this invention uses a straight chain, low molecular weight hydrocarbon to control surface foaming. The invention provides an excellent water based paint for applications in which water based aerosol paints have not previously been suitable.

2. Description of the Prior Art

Water based spray paint formulations have been available for some time. The advantages of incorporating water into an aerosol paint formulation are well known: reduction of flammability and cost, as well as a reduction of volatile organic compounds that may be hazardous or contribute to air pollution. These paints typically include a water reducible resin for forming the paint film, water, a water miscible solvent, a water compatible propellant such as dimethyl ether or similar compounds, and pigments. See, for example, Brouillette et al. (U.S. Pat. No. 4,518,734); Rapaport et al. U.S. Pat. No. 4,482,662); Rapaport et al. (U.S. Pat. No. 4,420,575); Page et al. (U.S. Pat. No. 4,384,661); Suk (U.S. Pat. No. 4,450,253); and Suk (U.S. Pat. No. 4,265,797).

The water borne aerosol coatings disclosed in the prior art have been used exclusively for decorative spray coatings that typically provide a convenient means for touching up small areas or objects. They have not been suitable for carrying the high non-volatile content necessary for site marking purposes. Paints used for site marking (typically on porous and uneven surfaces such as asphalt or dirt) must provide an opaque, high visibility, long-lasting mark to assure a positive communication of site data to others who are working in the same area.

Prior art emulsified or water reducible aerosol coatings have also exhibited a marked tendency to produce surface foam in the applied film. This problem is characteristic of all oil-in-water aerosol formulations, and results from entrapped volatile hydrophobic propellant escaping from the continuous high surface tension water film. Brouillette et al. claim to have solved this problem by using dimethyl ether as a propellant. However, in practice the foaming problem has continued. The prior art teaches various methods to deal with this foaming problem using different defoamer compounds, which are generally based on silicone derivatives. These compounds are relatively expensive and only partially remedy the foaming problem.

SUMMARY OF THE INVENTION

It is an object of this invention to provide an improved water based aerosol paint suitable for use in site marking applications. The paint must form an opaque, high visibility, long-lasting mark on porous and uneven surfaces.

It is another object of this invention to provide a water based aerosol paint having the high non-volatile content necessary for marking on asphalt or dirt.

It is still another object of the invention to provide a water based aerosol paint with a reduced tendency to produce surface foam in the applied film. A further object of this invention is to control surface foaming at a moderate cost.

These and related objects may be achieved through the use of high levels of calcium carbonate to provide a support for the paint pigment and resin film. The paint formulation is delivered with a novel inverted form of application, which is particularly suited to marking horizontal construction site surfaces in the survey and construction fields. This invention utilizes a straight chain, low molecular weight hydrocarbon, such as n-hexane, to control the surface foaming problem.

This invention provides a water based aerosol marking paint exhibiting excellent opacity and visibility, while avoiding the foaming problems encountered with previous water based aerosol paints. These features are provided at moderate cost by eliminating the need for costly defoaming compounds.

The attainment of the foregoing and related objects, advantages and features of the invention should be more readily apparent to those skilled in the art after review of the following more detailed description of the invention.

DETAILED DESCRIPTION OF THE PREFERRED EMBODIMENT

Figure 1:
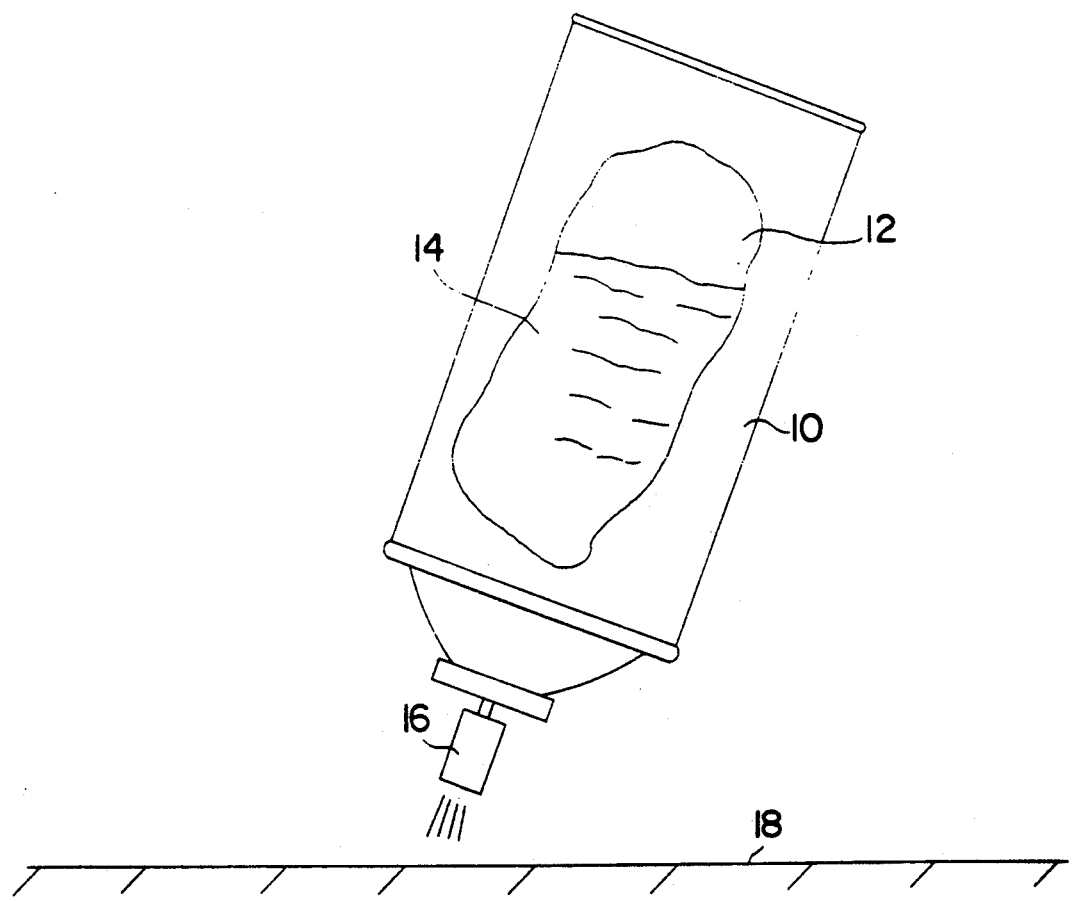
FIG. 1 is a partial cut-away representation of an aerosol paint canister showing inverted application of a marking paint.

This invention constitutes an improved water based aerosol paint. The foaming problem common to water based aerosol paints is controlled by use of a low molecular weight, straight chain hydrocarbon. Unlike prior water based aerosol paints, the composition is suitable for site marking applications because of the high non-volatile content of the mixture. In contrast to prior art water based aerosol paints, which are applied with the paint canister upright, the mixture is delivered through a novel, inverted form of application.

The paint composition of this invention includes the basic components found in other water soluble aerosol paints. These generally comprise one or more pigments, a water reducible resin, water, one or more water miscible solvents, a propellant. In addition to these basic ingredients, this invention uses a straight chain, low molecular weight hydrocarbon as a defoaming agent. A high level of calcium carbonate may be used to enhance the marking properties of the paint. Compositions of the invention fall within the following ranges (given as percentages by weight):

| | |
|---|---|
| Pigment(s) | 0–20 |
| Water reducible resin | 5–30 |
| Deionized water | 15–60 |
| Water miscible solvent(s) | 2–30 |
| Propellant | 10–40 |
| Defoamer | 2–20 |
| Calcium carbonate | 0–25 |

The preferred embodiment also uses a pH modifier, a thickening agent, and drying agents.

The prior art teaches a number of commercially available resins suitable for water soluble aerosol paints. These include oil-free or oil modified alkyd resins, acrylic resins, alkyd resins modified with other polymerizable monomers including acrylic acids and esters, chain stopped alkyd resins, and a number of other resins. These resins are generally solubilized by neutralization of acidic or basic sites on the resins.

In the preferred embodiment of this invention, an acrylic alkyd resin is used. An 28% aqueous ammonium hydroxide solution (or similar basic solution) is used to neutralize the acid sites on the resin, thus helping to solubilize the resin. The pH of the final products should preferably be above 8.0 and preferably not above 9.0.

The prior art teaches many water miscible solvents which may be used to help solubilize the resin in water. See, for example, the solvents taught by Brouillette et al. in U.S. Pat. No. 4,518,734 (including alcohols, ketones, acetates, and glycol ethers, giving specific examples). In the preferred embodiment of this invention, isopropyl alcohol is used. In addition, the preferred embodiment of the invention also uses a coalescing solvent which has an affinity for both water and the resin. The coalescing solvent assists in coalescence of the separate resin particles into a uniform and continuous coating on the surface on which the composition is sprayed. The coalescing solvent may be any solvent soluble in water and which is also slow to evaporate. Suitable co-solvents are the commercial products known as "Cellosolves," Carbitols, etc., which include glycol ethers, such as ethylene glycol mono alkyl ethers (ethylene glycol mono butyl ether, etc.) and ethylene glycol mono alkyl acetates (ethylene glycol mono methyl ether acetate, etc.).

A number of suitable propellants are taught by the prior art. The preferred propellant is dimethyl ether, which is generally regarded as environmentally safe.

Addition of low molecular weight, straight chain hydrocarbons with preferably between 5 and 8 carbon atoms (such as n-pentane, n-hexane, n-heptane, n-octane, n-pentene, n-hexene, n-heptene, n-octene, n-pentyne, n-hexyne, n-heptyne, and n-octyne) has been found to control foaming. This eliminates the requirement of the expensive defoaming agents used in the prior art. The mechanism by which these compounds prevent foaming is believed to be as follows: The straight chain hydrocarbon is immiscible with the water based paint. Therefore, it concentrates at the air-liquid interface after the paint is applied. This forms a transition zone which permits propellant dissolved in the water based paint to evaporate less violently, thereby substantially eliminating the foaming problem.

To enhance the marking ability of the paint and to prevent the paint from being absorbed by porous surfaces such as asphalt and dirt, the preferred embodiment also includes high levels of calcium carbonate. In the preferred embodiment, the amount of calcium carbonate used approach critical pigment volume. This ingredient is commercially available under the name omyacarb, which is produced by Pleuss Staufer Co., and is characterized by calcium carbonate particles having an average diameter of 3.5 microns. The high levels of inert calcium carbonate serve to block the normal tendency of an applied pigmented liquid paint film to migrate into the generally porous substrate to which the mark is applied. To the degree that this phenomenon occurs, the paint pigment is lost to its preferred position in the exposed outer surface of the paint film, with a consequent reduction in the visibility of the applied mark. The preponderance of calcium carbonate in the applied film provides an immediate high film viscosity that immobilizes the paint pigments in a position contiguous to the surface where optimal color appearance and surface masking are achieved.

In addition to calcium carbonate, fumed silica (sold commercially as Aerosil R-972) may be used as a thickening agent. This ingredient is used is lesser amounts, and serves to give body to the formulation and thereby aid in hold-out of the paint when the composition is deposited on a porous substrate.

A variety of suitable pigments for water soluble aerosol paints are known. The pigments should be fade resistant when exposed to normal ultraviolet radiation. Long-lasting, high visibility paint can be achieved by combining a high visibility pigment (such as a fluorescent pigment) with a smaller amount of light fast toner pigment which prevents fading of the paint.

As known in the art, drying agents are preferably added to facilitate drying and hardening of the resin. The preferred embodiment uses two drying agents: Zirco 12% and Cobalt 12%. Zirco 12% is a solution of zirconium soap in mineral spirits containing 12% zirconium metal. Cobalt 12% is a solution of cobalt soap in mineral spirits containing 12% cobalt metal.

A typical composition in accordance with the present invention follows (percentages by weight):

| Water Based Fluorescent Orange Aerosol Marking Paint | |
|---|---|
| Acrylic Alkyd Resin Solids | 5.9–7.2% |
| Deionized Water | 20.0–28.0% |
| Isopropyl Alcohol | 5.6–6.8% |
| Butyl Cellosolve | 1.3–1.6% |
| Dimethyl Ether | 30.0–37.0% |
| n-Hexane | 2.8–3.5% |
| 28% Aqueous Ammonium Hydroxide | 0.5–0.7% |
| Calcium Carbonate | 12.1–14.8% |
| Fumed Silica | 0.5–0.7% |
| Pigments | |
| Fluorescent Pigment (GT-15) | 6.0–10.0% |
| Toner Pigment (Quinacradone Red) | 0.3–0.6% |
| Toner Pigment (Hansa Yellow) | 1.1–1.9% |
| Drying agents | |
| Zirco 12% | 0.02–0.05 |
| Cobalt 12% | 0.04–0.09 |

Paints in accordance with the present invention are prepared by premixing the water reducible resin, water, pH modifier, coalescing solvents, water miscible solvents, and defoaming agent in a manufacturing vat. The dry pigments are then charged under high shear dispersion, to wet the individual pigment particles. The balance of the formula ingredients are then added to the batch. Batched material is introduced to aerosol canisters on a metered line. Once the batched material is inserted to the canisters, aerosol dispenser valves are crimped to the canisters. The propellant is then injected into the canisters through the dispenser valves.

With reference to FIG. 1, a partial cut-away representation of an aerosol paint canister shows the preferred method of application of paints in accordance with the present invention. Canister 10 contains a gaseous phase 12 composed primarily of propellant, and a liquid/solid slurry phase 14 which contains the remainder of the paint composition. Pressure exerted upon dispenser valve 16 opens the valve, releasing the paint composition from canister 12 and directing the paint composition onto surface 18.

In the preferred embodiment, the paint composition is applied with canister 12 inverted. This form of application is particularly well-suited to paint application for purposes of marking horizontal site surfaces, for example in survey or construction work. Moreover, because of the relatively high levels of solids and low volatility liquids in the paint composition, inverted application is more efficient than upright application. Note that in the preferred embodiment, canister 12 is not equipped with the conventional dip tube designed to conduct product from the lower portion of the aerosol container vertically to the dispenser valve and sprayhead (as used in paint canisters for upright application). Prior art water based aerosol paints have only been delivered using the upright application system.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A water based aerosol paint comprising the following ingredients by weight:
   (a) from about 5-30% water reducible resin;
   (b) from about 15-60% water;
   (c) from about 2-30% water miscible solvent;
   (d) from about 10-40% propellant;
   (e) from about 2-20% of a defoamer selected from the group consisting of straight chain hydrocarbons having from 5 to 8 carbon atoms; and
   (f) which composition is essentially free of other defoaming agents and exhibits the property of reduced foaming as compared to composition without defoamers.

2. The composition of claim 1 further comprising from about 0-20% pigment.

3. The composition of claim 2 which further comprises from about 0-25% calcium carbonate, and which composition exhibits the property of enhanced marking ability on porous surfaces.

4. The composition of claim 3, wherein the propellant is dimethyl ether.

5. The composition of claim 1, wherein the defoamer is selected from the group consisting of straight chain hydrocarbons having 6 to 7 carbon atoms.

6. The composition of claim 5, wherein the defoamer is n-hexane.

7. The composition of claim 3, wherein the defoamer is selected from the group consisting of straight chain hydrocarbons having 6 to 7 carbon atoms.

8. The composition of claim 7, wherein the defoamer is n-hexane.

9. A method for making a water based aerosol paint comprising the steps of:
   (a) preparing a mixture of from about 5-30% water reducible resin, from about 15-60% water, from about 2-30% water miscible solvent, and from about 2-20% of a defoamer selected from the group consisting of straight chain hydrocarbons having from 5 to 8 carbon atoms, said percentages being based on weight of said aerosol paint after introduction of a propellant;
   (b) introducing said mixture into an aerosol canister; and
   (c) introducing propellant into said canister, said propellant comprising from 25-40% by weight of said aerosol paint, said percentages being based on weight of said aerosol paint after introduction of said propellant.

10. The method of claim 9, wherein said mixture further comprises from about 0-20% pigment.

11. The method of claim 10, wherein said mixture further comprises from about 0-25% calcium carbonate.

12. The method of claim 11, wherein the propellant is dimethyl ether.

13. The method of claim 9, wherein the defoamer is selected from the group consisting of straight chain hydrocarbons having 6 or 7 carbon atoms.

14. The method of claim 13, wherein the defoamer is n-hexane.

15. The method of claim 11, wherein the defoamer is selected from the group consisting of straight chain hydrocarbons having 6 or 7 carbon atoms.

16. The method of claim 15, wherein the defoamer is n-hexane.

17. A water based aerosol paint comprising the following ingredients by weight:
   (a) from about 5-10% water reducible resin;
   (b) from about 20-30% water;
   (c) from about 5-12% water miscible solvent;
   (d) from about 25-40% propellant;
   (e) from about 2-7% of a defoamer selected from the group consisting of straight chain hydrocarbons having from 5 to 8 carbon atoms, said composition essentially free of other defoaming agents;
   (f) from about 5-15% pigment;
   (g) from about 10-28% calcium carbonate; and
   (h) which composition exhibits the properties of reduced foaming as compared to compositions without defoamers and enhanced marking ability on porous surfaces.

18. The composition of claim 17, wherein the propellant is dimethyl ether.

19. The composition of claim 17, wherein the defoamer is selected from the group consisting of straight chain hydrocarbons having 6 or 7 carbon atoms.

20. The composition of claim 19, wherein the defoamer is n-hexane.

* * * * *